W. W. STILLWELL.
BOLT AND NUT LOCK.
APPLICATION FILED JUNE 14, 1920.
1,358,795.
Patented Nov. 16, 1920.
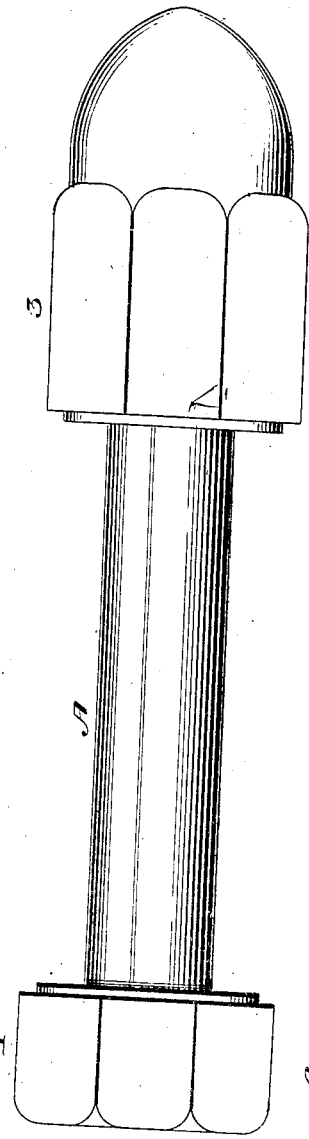
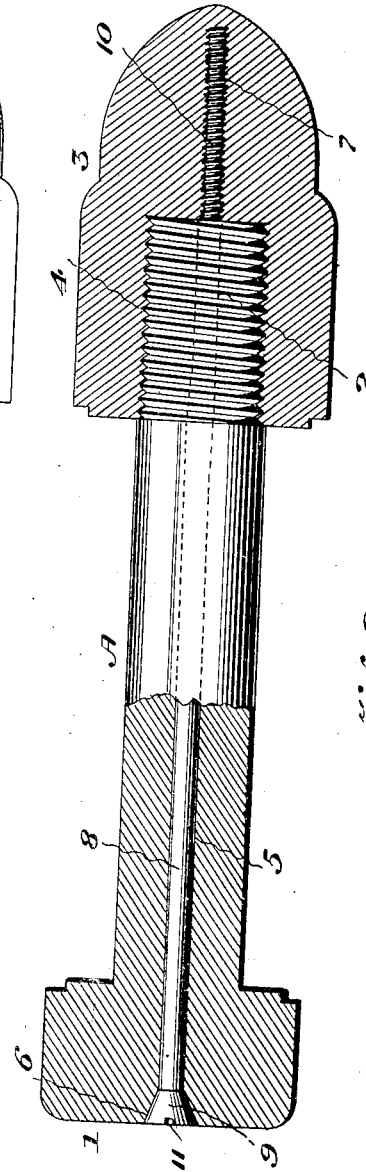
Witness
Inventor
Wendell W. Stillwell
By Louis Bagger & Co
his Attorneys.

UNITED STATES PATENT OFFICE.

WENDELL W. STILLWELL, OF MOUNT VERNON, OHIO.

BOLT AND NUT LOCK.

1,358,795.  Specification of Letters Patent.  Patented Nov. 16, 1920.

Application filed June 14, 1920. Serial No. 388,817.

*To all whom it may concern:*

Be it known that I, WENDELL W. STILL-WELL, a citizen of the United States, residing at Mount Vernon, in the county of Knox and State of Ohio, have invented certain new and useful Improvements in Bolt and Nut Locks, of which the following is a specification.

My invention relates to an improvement in a combination locking bolt and nut.

The object is to provide a simple means of locking the nut on a bolt so that it will not work loose.

This invention consists in a bolt having a smooth bore extending axially throughout its length, and a threaded end, a nut to screw on the end, which nut has a threaded bore in alinement with the smooth bore of the bolt, and a screw having threads at one end of a length adapted to screw only into the smaller threaded bore of the nut to hold the latter against turning.

In the accompanying drawings:

Figure 1 is a view in side elevation;

Fig. 2 is a longitudinal section.

A, represents the bolt having an angular head 1 at one end, and threads 2 at the other. The numeral 3 represents the nut having threads 4 adapted to screw on the threads 2 of the bolt in the usual fashion.

The head of the bolt and the shape of the nut may vary, and the threads may be right or left threads, as desired.

The bolt has a bore 5 which extends axially throughout the entire length of the bolt. This bore is comparatively small and smooth throughout, with a countersink 6 at the head end of the bolt. The nut 3 has a small threaded bore 7, the threads of which extend in the opposite direction from the threads 2 on the bolt, and the pitch of the threads 7 is preferably different from the pitch of the threads 2, and, as shown, the diameter of its bore is several times less than that of the threaded bore 2.

A screw or bolt 8 is smooth throughout the major part of its length to approximately fit the bore 5 of the bolt, and its head 9 in the case of a screw is cone-shape to fit and rest in the countersink 6.

The screw or bolt 8 is of greater length than the bolt. Its length is approximately the length of the bolt plus the length of the small threaded bore 7, and this protruding end is provided with screw-threads 10 of a size and pitch to fit the threads of bore 7.

To lock the nut 3 on the bolt, the nut is first screwed tight on the bolt. The screw or bolt 8 is then inserted through the bore 5 of the bolt and screwed tight, or until its head 9 becomes seated in the countersink 6, and its threaded end 10 is screwed tightly into the threads of bore 7.

This forms an effectual lock. It is quickly operated, and it makes it impossible for the nut 3 to work loose, or to be removed until the screw 8 shall have first been unscrewed and removed from the bolt and nut. It is understood, however, that in place of the screw-head the locking bolt may be provided with the usual bolt-head in which case the locking bolt head is screwed down against the upper surface of the main bolt head by the usual wrench.

The screw 8 is preferably provided with the usual cross-slot 11 to receive a screw-driver, thus simplifying the operation of locking the nut on the bolt.

The present invention is much less expensive, much more simple, while equally, if not much more, effective.

Furthermore, the screw 8 is, or may be, of standard make, which obviously means a reduction in cost, which is always a desideratum.

I claim:

1. A bolt and nut lock which includes a threaded bolt and nut adapted to be screwed together in the usual manner, said members having alined axial bores, the bore through the bolt entirely smooth and extending throughout the length thereof, and the threaded bore in the nut threaded upon a different pitch and in a different direction from the threads on the bolt, the outer end of the bore of the bolt in the form of a countersink, and a screw of greater length than the bolt, smooth throughout the length of the bolt and threaded at the protruding end to fit and screw into the threads of the smaller bore of the nut, and the head of the bolt in the form of a cone which fits the countersink in the head of the bolt, said head slotted to receive a screw-driver, whereby to turn the screw into the small threads of the nut.

2. A bolt and nut lock which includes a threaded bolt and nut adapted to be screwed together in the usual manner, said members having alined axial bores, the bore through the bolt entirely smooth and extending throughout the length thereof, and the alined bore in the nut threaded upon a different pitch and in a different direction from the threads on the bolt, and a screw of greater length than the bolt, smooth throughout the length of the bolt and threaded at the protruding end to fit and screw into the threads of the smaller bore of the nut.

3. A bolt and nut lock which includes a threaded bolt and nut adapted to be screwed together in the usual manner, said members having alined axial bores, the bore through the bolt entirely smooth and extending throughout the length thereof, and the alined bore in the nut threaded upon a different pitch and in a different direction from the threads on the bolt, the outer end of the bore of the bolt in the form of a countersink, and a screw of greater length than the bolt, smooth throughout the length of the bolt and threaded at the protruding end to fit and screw into the threads of the smaller bore of the nut, whereby the head of the bolt is screwed down against the upper surface of the main bolt head.

4. A locking bolt and nut, which includes a standard bolt having a head on one end, and a thread on the other, counterbored through the longitudinal center and countersunk, the bore having a conical outer end, a standard screw of greater length than the bolt provided with a head adapted to be countersunk in the conical outer end of the bore, its protruding end threaded, and a nut having a threaded orifice which screws on the threads of the nut and provided with a smaller threaded bore into which the threaded end of the screw is turned, the parts being assembled by screwing the nut on the bolt, and finally extending the screw through the bolt and turning it into the smaller threaded bore of the nut.

In testimony whereof I affix my signature.

WENDELL W. STILLWELL.